United States Patent [19]
Wu

[11] Patent Number: 5,508,588
[45] Date of Patent: Apr. 16, 1996

[54] TELEVISION STARTUP CURRENT REGULATION

[75] Inventor: Chun Hsing Wu, Singapore, Singapore

[73] Assignee: Thomson Consumer Electronics, S.A., France

[21] Appl. No.: 904,303

[22] Filed: Jun. 25, 1992

[30] Foreign Application Priority Data

Jun. 27, 1991 [GB] United Kingdom .................... 9113942

[51] Int. Cl.⁶ .................................................. H02M 3/335
[52] U.S. Cl. ................................ 315/8; 315/85; 315/370; 363/21
[58] Field of Search .................................. 363/21; 315/8, 315/85, 370

[56] References Cited

U.S. PATENT DOCUMENTS 4,164,775   8/1979   Slegers .
4,530,550   7/1985   Kondo ................................. 315/241 P

FOREIGN PATENT DOCUMENTS 1251866   11/1971   United Kingdom .
1553276   9/1979    United Kingdom .
1560443   6/1980    United Kingdom .
2193615   2/1988    United Kingdom .

OTHER PUBLICATIONS

IEEE Standard Dictionary of Electrical and Electronics Terms, Third Ed. 1984 p. 377.

*Primary Examiner*—Robert J. Pascal
*Assistant Examiner*—Michael B. Shingleton

[57] ABSTRACT

A television receiver has a switched mode power supply controller, which may be deflection synchronized, which produces pulses in a power transformer. To power the controller during startup, before the internal power supply has started, a storage capacitor on the power supply input of the controller is coupled through a current limiting resistance to a rectified voltage from the AC mains so as to charge the storage capacitor during first polarity phases of the AC mains. The current limiting resistance includes a positive temperature coefficient (PTC) element which increases its impedance as it heats, to reduce power dissipation after initial connection of the television receiver to AC mains. In addition, a diode is coupled in a current path to the storage capacitor to charge the capacitor to the same polarity as during opposite polarity phases of the AC mains. The two paths for charging the capacitor allow a relatively smaller value for the current limiting resistance, which remains coupled to the storage capacitor, and provides sufficient power to the controller without undue power dissipation over a wide range of power mains voltages.

1 Claim, 1 Drawing Sheet

TELEVISION STARTUP CURRENT REGULATION

The invention relates to the startup of a switched mode power supply in a television receiver.

In a television receiver having a switched mode power supply (SMPS), which may be deflection synchronized, the primary winding of a power transformer is energized by a pulse width modulated signal. The secondary windings of the transformer energize DC power supplies which provide power to operational loads, including the SMPS controller. In the start up interval, immediately after switching the television receiver on, it is necessary to initiate generation of power through the power transformer in order to begin operation. The SMPS controller itself may be powered from a storage capacitor which is initially charged by rectified AC mains current through a current limiting resistor. The capacitor charges initially when the television receiver is connected to the AC mains (i.e., plugged in) and remains charged for energizing the controller whenever the television receiver is either in the standby mode or run mode of operation.

The current limiting resistor dissipates power as long as the television receiver is coupled to the AC mains. However, for purposes other than providing power during the startup interval, this power is wasted. The current limiting resistor can have a high resistance to reduce power dissipation, but a higher resistance results in a reduced current supply for operation of the controller, and slower charging of the storage capacitor. It is necessary to reconcile the need for current to the controller in the startup interval with the need to reduce power dissipation in the current limiting resistor at all other times.

In designing a switched mode power supply, it is advantageous to provide a single circuit that is operable over a range of different mains voltages. The standard mains voltages for the US and for Europe, for example, differ substantially. A circuit which is optimal at one mains voltage may include current limiting elements which produce excessive power dissipation, inadequate current supply or other adverse effects when operated at a different mains voltage.

Apart from circuitry associated with startup of operational power, television receivers are typically provided with degaussing coils which demagnetize ferromagnetic parts of the picture tube to improve color purity. The degaussing coils may be coupled to the AC mains through one or more variable impedance elements that progressively reduce the current applied to the degaussing coils over a degaussing interval following the connection of the television to the AC mains. The current limiting elements can be positive or negative temperature coefficient resistors, also known as thermistors. In one technique, a first temperature dependent resistor having a positive coefficient is coupled to the AC mains in series with the degaussing coil. A second temperature dependent resistor having a positive coefficient is coupled across the AC mains, the two temperature dependent resistors being thermally coupled to each other such that each heats the other. As the resistances of the elements change with heating, current through the degaussing coil falls off to a minimum level which does not substantially affect color purity.

In an inventive arrangement, temperature dependent elements may be used in connection with the charging of a storage capacitor for the supply voltage of a switched mode power supply controller, as a means to limit power dissipation. In carrying out an inventive feature, operation of a television receiver during startup is optimized by coupling the degaussing circuitry with the current limiting means for charging the storage capacitor that provides power to the switched mode power supply controller. A circuit for degaussing and current limited startup supply, optimized over a wide range of power mains voltages may thus be achieved.

In accordance with an aspect of the invention, a television apparatus has a degaussing coil for demagnetizing metal portions of a cathode ray tube. The degaussing coil is energized from an AC source, and coupled to a first temperature dependent impedance for controlling the current passing in the degaussing coil. The first temperature dependent impedance is thermally coupled to a second temperature dependent impedance for heating the first temperature dependent impedance. A power supply includes a capacitance for energizing a load circuit. The capacitance is charged through the second temperature dependent impedance.

In accordance with another aspect of the invention, a television apparatus having a power supply includes a capacitance for energizing a load circuit and a source for charging the capacitance. A start-up circuit comprises a source of AC current. A first polarity of the AC current is passed to charge the capacitance, and an opposite polarity of the AC current is passed through a temperature sensitive impedance via a path independent of the path of the first polarity of the AC current, to charge the capacitor in the same direction as said first polarity of said AC current.

Figure 1:
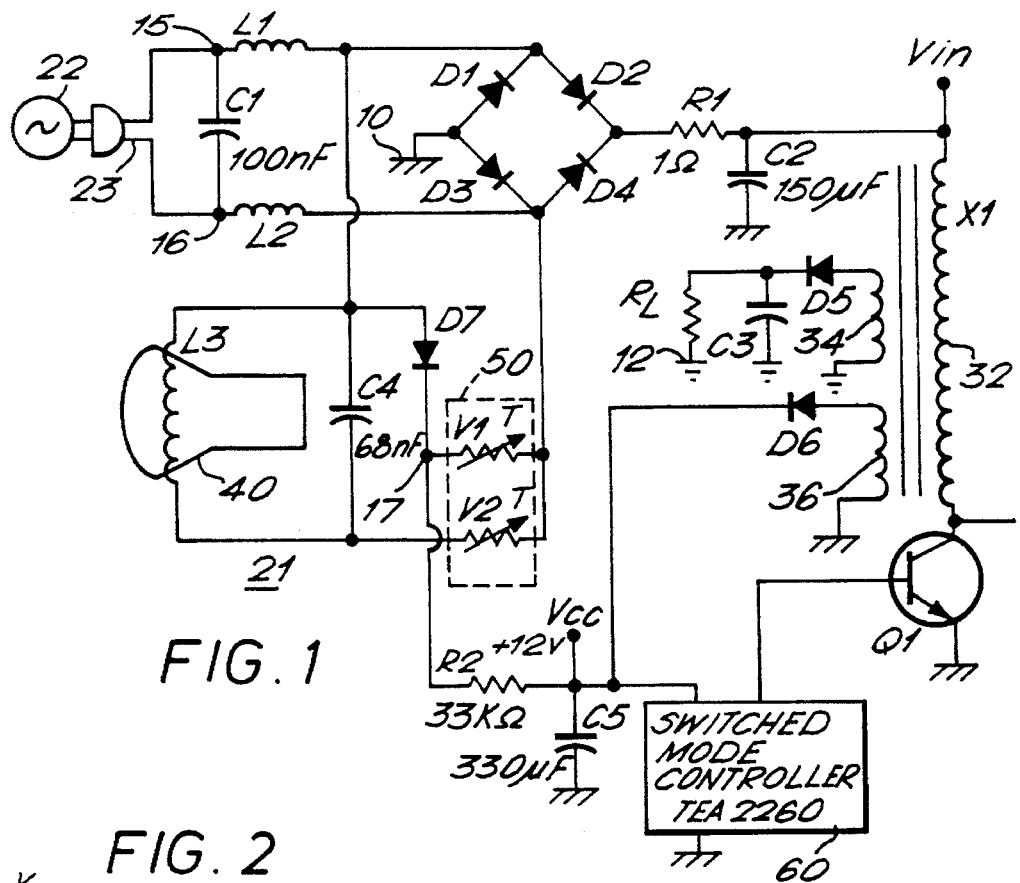
FIG. 1 is a schematic circuit diagram of part of a television receiver incorporating a startup current supply according to the invention.

In a television receiver as shown in FIG. 1, power for the operational loads is derived from a power transformer X1 when driven by a switched mode power supply controller 60 and a power output transistor Q1. In some applications, the power transformer may be a horizontal output transformer. The various operational loads are coupled to secondary windings of transformer X1, one operational load RL being shown as coupled to a secondary winding 34. A diode D5 and a filter capacitor C3 are coupled to the secondary winding 34 for supply of regulated DC voltage to load RL. Additional secondary windings typically are provided for power supply at different voltage levels, as required for operating the loads. Only two windings, 34 and 36, are shown in order to simplify the drawing.

The supply voltage Vin to transformer X1 is derived from a full wave bridge rectifier formed by diodes D1 through D4, coupled to the AC mains 22 through plug 23, surge suppressor chokes L1, L2, and bypass capacitor C1. The full wave rectified output, at the cathodes of diodes D2 and D4 of the bridge rectifier, is coupled to the primary winding 32 of power transformer X1 through current limiting resistor R1 and filter capacitor C2. Supply voltage Vin is available whenever AC mains 22 is connected to the television receiver, but power to the loads RL is provided only after switched mode controller 60 becomes energized.

Secondary winding 36 of transformer X1 energizes the switched mode power supply controller 60 after initial startup, via diode D6. However, this voltage is available only during switching of transistor Q1. Since the supply of power to the controller is arranged functionally in a loop where output pulses of the controller are required before power can be provided through secondary winding 34, at startup, an alternate source of power to controller 60 is required.

The television receiver includes a degaussing circuit 21 which is energized for a brief interval following connection of AC mains 22 to the television receiver, for demagnetizing the ferromagnetic elements of a picture tube 40. The degaussing circuit includes a degaussing coil L3 coupled to AC mains 22 and variable resistance elements V1, V2, operable to reduce current to the degaussing coil over time such that AC current supplied to coil L3 starts at a high amplitude and then falls off to a minimum. The current limiting elements V1, V2 are positive temperature coefficient (PTC) resistors or thermistors, and are mounted in thermal contact with one another, as shown by broken line 50, such that the heat generated by each contributes to increasing the resistance of both.

One of the current limiting elements, V2, is coupled in series with the degaussing coil, the series branch being coupled across AC mains 22. When the television receiver is first connected to mains 22, the resistance of element V2 is low, and increases with heating due to dissipation of power with current flow through degaussing coil L3. The other variable resistance element, V1, is coupled in series with diode D7, the series branch being in parallel with AC mains 22, and adds to the current passing through element V1, and therefore adds to the heating of element V2. Diode D7 blocks current through element V1 during each alternate phase of the voltage supplied by AC mains 22.

In carrying out an aspect of the invention, the cathode of diode D7 is coupled to a current limiting resistor R2 at a terminal 17 to provide startup current to SMPS controller 60. Diode D7, in cooperation with diode D3 of the mains bridge, forms a half wave rectifier of the AC mains voltage, that in conjunction with resistor R2 provides a first path for low level DC current to charge filter capacitor C5. Diode D7 and D3 conduct during the positive phase of the AC mains voltage, i.e. when terminal 15 is positive relative to terminal 16.

During the alternate negative phase of the AC mains voltage, when terminal 15 is negative relative to terminal 16, diode D1, of the mains bridge, provides half wave rectification of the AC mains voltage to resistor R2 via PTC resistor V1. Diodes D1 and PTC resistor V1 form a second current path which provides a low level DC current to charge filter capacitor C5.

By means of the two alternating conducting current paths, capacitor C5 charges to a level that provides adequate operating voltage to SMPS controller 60, to begin free running power supply operation.

Rectifying diode D6, coupled to secondary winding 36 of transformer X1, blocks discharge of capacitor C5 through winding 36 when SMPS controller 60 is not energizing transformer X1, and provides the main charging path for capacitor C5 when the SMPS controller is energizing the transformer.

The circuit shown is advantageous because it operates over a wide range of mains voltages and is effective at both high mains voltage and at low mains voltage for providing adequate current to charge storage capacitor C5, while reducing unnecessary power dissipation in current limiting resistor R2. This aspect of the invention may be appreciated by comparing the curves of FIGS. 2 and 3, which show the voltages over time at the cathode of diode D7 at a lower mains voltage, e.g., about 90 V RMS (FIG. 2) and at a higher mains voltage, e.g., about 270 V RMS (FIG. 3). The curves represent the steady state operation of the circuit, after PTC resistors V1, V2 have reached their maximum temperature and resistance values.

Figure 2:
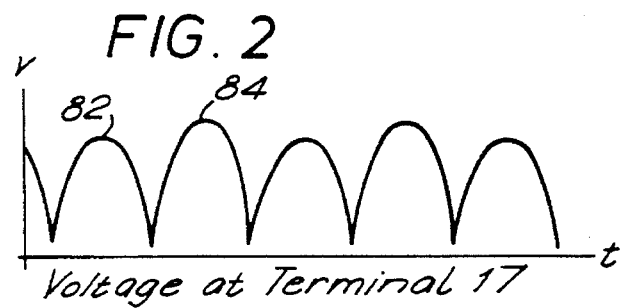
FIG. 2 is a graph of voltage vs. time in the circuit shown in FIG. 1 at the junction of current limiting resistor R2 and diode D7 with respect to ground.
Figure 3:
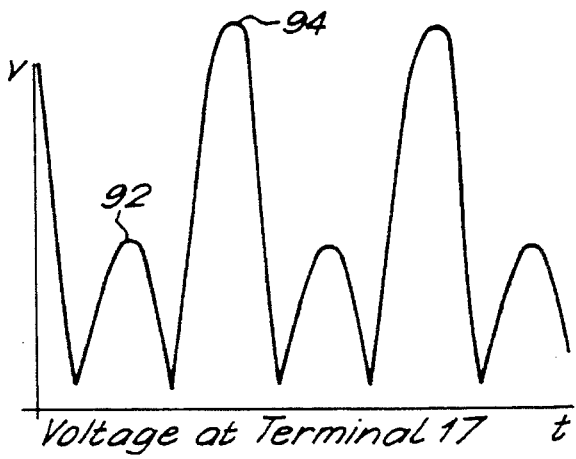
FIG. 3 is a graph of voltage vs. time at the same point as in FIG. 2, but at a higher mains voltage.

In both FIGS. 2 and 3, the voltage at the cathode of diode D7 is higher in the positive phase 84, 94 of power on AC mains 22 than in the negative phase 82, 92. This occurs because in the positive phase, diode D7 is forward biased and the voltage applied to resistor R2 at terminal 17 is equal to the mains voltage. In the negative phase, PTC resistor V1 is coupled between the mains and terminal 17 and absorbs some of the mains voltage before it is applied to resistor R2.

At the relatively lower mains voltage in FIG. 2, the PTC resistors are heated to a relatively lower temperature than at the higher mains voltage of FIG. 3 because the extent of heating is a function of the power dissipation in the PTC resistors. Since the heating of the PTC resistors is a nonlinear effect, the substantially higher resistance of PTC resistor V1 at the higher mains voltage and temperature is such that the voltage applied to resistor 12 in the negative phase is proportionately much lower than the voltage in the positive phase when operating at the higher mains voltage. Thus, the relative amplitude of 82 to 84 at the lower mains voltage is closer to unity than the relative amplitude of 92 to 94 at the higher mains voltage. The difference in the illustrated example is such that power dissipated in current limiting resistor R2 is reduced by about 25% over the range of mains voltages from 90 VAC to 250 VAC.

It should be noted that the startup circuit of the instant invention uses the PTC resistor V1, which is part of the degaussing circuitry. As a result, the startup circuit requires only a few parts in addition to the degaussing circuitry.

It should be further noted that diode D7 reduces the power dissipated by PTC resistor V1 by about half. Nevertheless, the degaussing function is not impaired. The residual current through degaussing coil L3 after the end of the degaussing interval is insignificant.

In some applications, it may be desirable to operate the SMPS in synchronism with deflection in order to prevent switching transients from appearing on the display screen. In such an arrangement, the SMPS would free-run during start-up until stable synchronization signals become available.

What is claimed is:

1. A television apparatus having a degaussing coil for demagnetizing metal portions of a cathode ray tube, said degaussing coil being energized from an AC source, and coupled to a first temperature dependent impedance for controlling the current passing in said degaussing coil, said first temperature dependent impedance being thermally coupled to a second temperature dependent impedance for heating said first temperature dependent impedance, a power supply including a capacitance for energizing a load circuit, and means for charging said capacitance through said second temperature dependent impedance, said capacitor being additionally charged through a path including a rectifier, said path being independent of said first and second temperature dependent impedances.

* * * * *